United States Patent
Ke (10) Patent No.: US 9,488,861 B2
(45) Date of Patent: Nov. 8, 2016

(54) DISPLAY DEVICE

(71) Applicant: Au Optronics Corporation, Hsinchu (TW)

(72) Inventor: Wei-Chih Ke, New Taipei (TW)

(73) Assignee: Au Optronics Corporation, Hsinchu (TW)

( * ) Notice: Subject to any disclaimer, the term of this patent is extended or adjusted under 35 U.S.C. 154(b) by 310 days.

(21) Appl. No.: 14/144,606

(22) Filed: Dec. 31, 2013

(65) Prior Publication Data

US 2015/0003043 A1 Jan. 1, 2015

(30) Foreign Application Priority Data

Jun. 28, 2013 (TW) .............................. 102123277 A (51) Int. Cl.
*G09F 13/04* (2006.01)
*G02F 1/1335* (2006.01)

(52) U.S. Cl.
CPC . *G02F 1/1336* (2013.01); *G02F 2001/133624* (2013.01)

(58) Field of Classification Search
CPC ................................... F21K 9/56; F21K 9/50
USPC .................. 362/97.1, 97.3; 349/61, 70, 106; 359/885
See application file for complete search history.

(56) References Cited

U.S. PATENT DOCUMENTS

| 2009/0316078 | A1 | 12/2009 | Hsu et al. | |
|---|---|---|---|---|
| 2011/0227487 | A1* | 9/2011 | Nichol | G02B 6/0018 315/158 |
| 2013/0016522 | A1* | 1/2013 | Baek | G09F 13/20 362/602 |

FOREIGN PATENT DOCUMENTS

| CN | 1996123 | 7/2007 |
|---|---|---|
| TW | 200905359 | 2/2009 |
| TW | I347467 | 8/2011 |

OTHER PUBLICATIONS

Mao Mao, "99% Adobe RGB LG 27" Semi-professional LCD, eNet.com.cn, http://www.enet.com.cn/display/, Jan. 4, 2013, p. 1-5.

*Primary Examiner* — Andrew Coughlin
*Assistant Examiner* — Meghan Ulanday
(74) *Attorney, Agent, or Firm* — Jianq Chyun IP Office (57) ABSTRACT

A display device includes a backlight module and a display panel. A spectrum of the backlight module has three peaks, so that the backlight module can emit a white light, wherein a full width at half maximum (FWHM) of the peak in a range of a green wavelength is less than or equal to 55 nm. The display panel is disposed on a light emitting surface of the backlight module, and includes a pixel array and a color filter array disposed correspondingly to the pixel array. The color filter array includes a red, a green and a blue filter patterns. The green filter pattern and the backlight module satisfy the following relations:

$$\sum_{553}^{562} BL(\lambda) \times CF_{Green}(\lambda) \times \Delta\lambda \le 4$$

$$\sum_{580}^{600} BL(\lambda) \times CF_{Green}(\lambda) \times \Delta\lambda \le 2$$

$$\sum_{601}^{650} BL(\lambda) \times CF_{Green}(\lambda) \times \Delta\lambda \le 1.2.$$

Besides, a x coordinate of green light of CIE is less than 0.22 and a y coordinate of green light of CIE is greater than 0.70.

14 Claims, 2 Drawing Sheets

DISPLAY DEVICE

CROSS-REFERENCE TO RELATED APPLICATION

This application claims the priority benefit of Taiwan application serial no. 102123277, filed on Jun. 28, 2013. The entirety of the above-mentioned patent application is hereby incorporated by reference herein and made a part of this specification.

BACKGROUND OF THE INVENTION

1. Field of the Invention

The invention relates to a display device, and more particularly to a display device with wide color gamut.

2. Description of Related Art

With advantages of high definition, small size, light weight, low driving voltage, low power consumption, and an extensive range of application, a liquid crystal display (LCD) has become a mainstream among various display products.

By measuring color saturation with a standard set by the National Television System Committee (NTSC) color television standard, a color gamut in current liquid crystal displays is generally in a specification of NTSC 72%. However, the liquid crystal display is gradually developed to provide a high color saturation. To satisfy consumers' demands, developments of a wide color gamut liquid crystal display and a high color reproduction are primary targets for persons skilled in this art.

SUMMARY OF THE INVENTION

The invention provides a display device with characteristics of wide color gamut and high color saturation.

The display device of the invention includes a backlight module and a display panel. A spectrum of the backlight module has three peaks, so that the backlight module can emit a white light, wherein a full width at half maximum (FWHM) of the peak among the three peaks in a range of a green wavelength is less than or equal to 55 nm. The display panel is disposed on a light emitting surface of the backlight module, and the display panel includes a pixel array and a color filter array disposed correspondingly to the pixel array. The color filter patterns includes a red filter pattern, a green filter pattern and a blue filter patterns so as to generate different color lights, and the green filter pattern and the backlight module satisfying following relation:

$$\sum_{553}^{562} BL(\lambda) \times CF_{Green}(\lambda) \times \Delta\lambda \leq 4$$

$$\sum_{580}^{600} BL(\lambda) \times CF_{Green}(\lambda) \times \Delta\lambda \leq 2$$

$$\sum_{601}^{650} BL(\lambda) \times CF_{Green}(\lambda) \times \Delta\lambda \leq 1.2$$

wherein $BL(\lambda) \times CF_{Green}(\lambda)$ represents a normalized result of a product of a luminance spectrum in a specific wavelength range and a transmittance of light in the specific wavelength range passing through the green filter pattern, and $\Delta\lambda$ is a light wavelength interval. Besides, a x coordinate of green light displayed by the display device corresponding to a chromaticity coordinates of CIE is less than 0.22 and a y coordinate of the green light displayed by the display device corresponding to the chromaticity coordinates of CIE is greater than 0.70.

In summary, in the display devices as provided in the embodiments of the invention, since spectra of the backlight modules all having three peaks in which a full width at half maximum of the peak of a green light is less than or equal to 55 nm; the combination of the green filter pattern and the backlight module meets the mathematical relation; and x coordinate of CIE is less than 0.22 and y coordinate of CIE is greater than 0.70 in green light display by the display device, therefore, the color gamut and the high color saturation of the display device are both enhanced so as to achieve the level of wide color gamut.

To make the above features and advantages of the disclosure more comprehensible, several embodiments accompanied with drawings are described in detail as follows.

DESCRIPTION OF THE EMBODIMENTS

Figure 1:
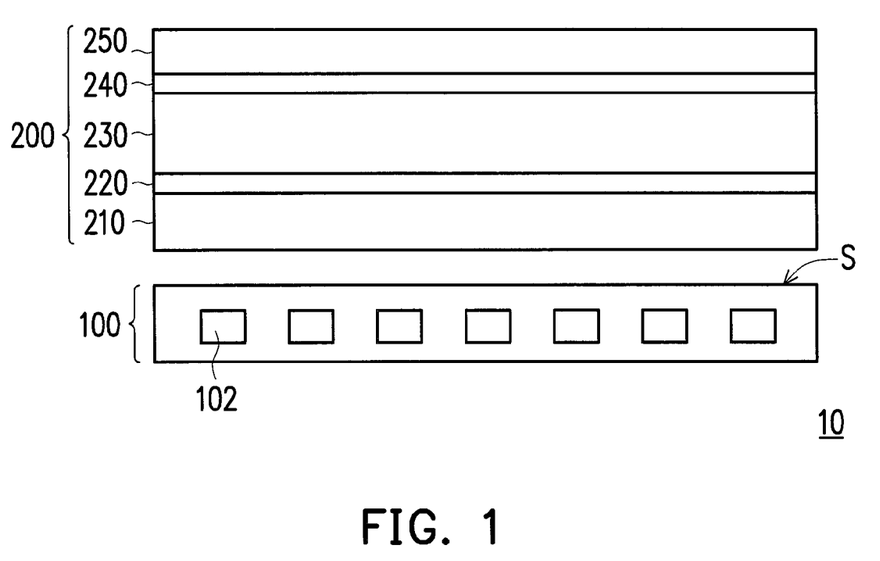
FIG. 1 is a schematic cross-sectional diagram illustrating a display device according to an embodiment of the invention.
Figure 2:
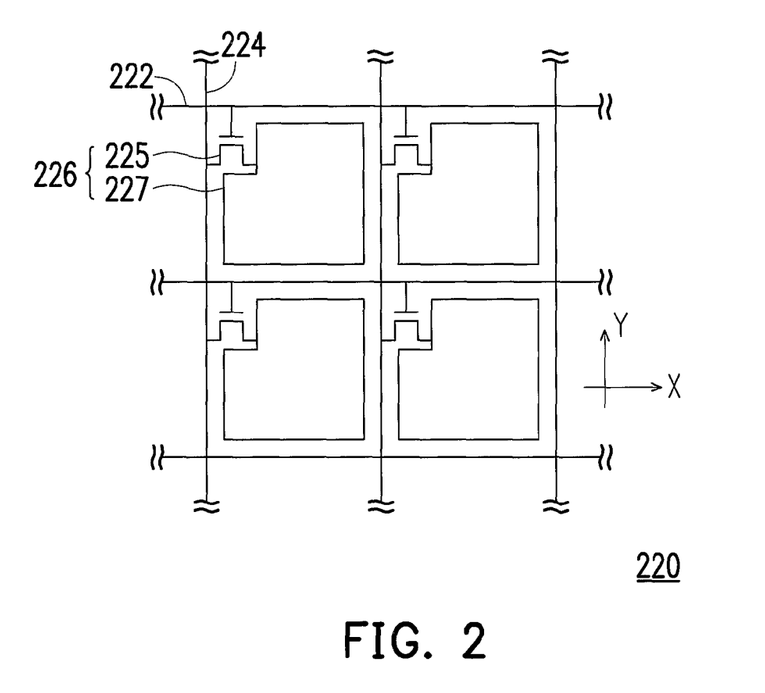
FIG. 2 is a top view of a pixel array depicted in FIG. 1.
Figure 3:
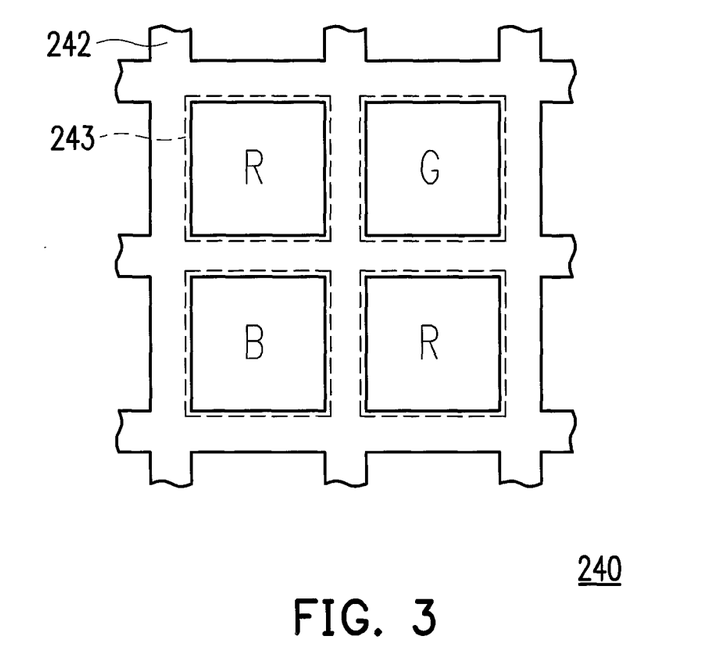
FIG. 3 is a top view of a color filter array depicted in FIG. 1.

FIG. 1 is a schematic cross-sectional diagram illustrating a display device according to an embodiment of the invention. FIG. 2 is a top view of a pixel array depicted in FIG. 1. FIG. 3 is a top view of a color filter array depicted in FIG. 1.

Referring to FIG. 1, a display device 10 of the present embodiment includes a backlight module 100 and a display panel 200. The backlight module 100 includes at least one light emitting diode unit 102. It should be noted that, for simplicity of the drawing, detailed structure of each component in FIG. 1 is not illustrated.

The backlight module 100 can provide a light source required by the display panel 200. More specifically, the light emitting diode unit 102 in the backlight module 100 can include three colors of lights (a red light, a green light and a blue light), said three colors of lights can mix to form a white light. Thus, a spectrum of the backlight module 100 provided to the display panel 200 has three peaks. More particularly, among said three peaks, a full width at half maximum (FWHM) of the peak in a range of a green wavelength is less than or equal to 55 nm. In other words, the green light provided by the backlight module 100 has a peak with a relatively narrower width, which represents that the backlight module 100 can provide the green light being more saturated. The light emitting diode unit 102 can be, for example, a light emitting diode package structure or a COB-type (chip on board) light emitting diode light bar.

More specifically, in order to have the red light, the green light and the blue light containing said three peak included in the light emitting diode unit 102 while having the full width at half maximum (FWHM) of the peak in the range of the green wavelength being less than or equal to 55 nm, the light emitting diode unit 102 can be implemented by using first to fifth embodiments as provided below.

In the first embodiment, the light emitting diode unit 102 includes at least one red light emitting diode, at least one blue light emitting diode and a green fluorescent material, wherein the red light emitting diode and the blue light emitting diode can be connected together in series, in parallel, in parallel and series, or can be driven independently. In the present embodiment, the green fluorescent material is, for example, a material of sulfide or oxynitride, wherein a fluorescent material of sulfide is, for example, $MGa_2S_4$:Eu, wherein M=Ca, Sr, Ba, and a fluorescent material of oxynitride is, for example, β-SiAlON.

In the second embodiment, the light emitting diode unit 102 includes at least one green light emitting diode, at least one blue light emitting diode and a red fluorescent material, wherein the green light emitting diode and the blue light emitting diode can be connected together in series, in parallel, in parallel and series, or can be driven independently. In the present embodiment, the red fluorescent material is, for example, a material of sulfide or nitride, wherein a fluorescent material of sulfide is, for example, CaS:Eu, and a fluorescent material of nitride is $CaAlSiN_3$:Eu or (CaSr)$AlSiN_3$:Eu.

In the third embodiment, the light emitting diode unit 102 includes at least one red light emitting diode, at least one green light emitting diode and at least one blue light emitting diode, wherein the red light emitting diode, the green light emitting diode and the blue light emitting diode can be connected together in series, in parallel, in parallel and series, or can be driven independently.

In the fourth embodiment, the light emitting diode unit 120 includes at least one blue light emitting diode, a red fluorescent material and a green fluorescent material. In the present embodiment, the red fluorescent material is, for example, a red quantum dot (QD), and the green fluorescent material is, for example, a green quantum dot (QD), wherein a material of said quantum dot (QD) is, for example, CdSe/ZnSe.

In the fifth embodiment, the light emitting diode unit 120 includes at least one blue light emitting diode, a red fluorescent material and a green fluorescent material. In the present embodiment, the red fluorescent material is, for example, a material of sulfide or nitride, wherein a fluorescent material of sulfide is, for example, CaS:Eu, and a fluorescent material of nitride is $CaAlSiN_3$:Eu or (CaSr)$AlSiN_3$:Eu; and the green fluorescent material is, for example, a material of sulfide or oxynitride, wherein a fluorescent material of sulfide is, for example, $MGa_2S_4$:Eu, wherein M=Ca, Sr, Ba, and a fluorescent material of oxynitride is, for example, β-SiAlON.

However, the light emitting diode unit 102 of the invention is not limited to the embodiment disclosed above, and it falls in the scope of the invention as long as the light emitting diode unit 102 is capable of emitting a white light with the spectrum having three peaks in which the full width at half maximum (FWHM) of the peak in the range of a green wavelength among the three peaks is less than or equal to 55 nm.

Referring back to FIG. 1, the display panel 200 is disposed at a light emitting surface S of the backlight module 100. The display panel 200 includes a substrate 210, a pixel array 220, a display medium 230, a color filter array 240 and a substrate 250. The substrate 210 and the substrate 250 are opposite to each other. The substrate 210 and the substrate 250 can be a glass substrate, a plastic substrate, a flexible substrate or other appropriate substrates. The display medium 230 is disposed between the substrate 210 and substrate 250. The pixel array 220 is disposed on the substrate 210 and located between the substrate 210 and the display medium 230, and the color filter array 240 is disposed on the substrate 250 and located between the substrate 250 and the display medium 230.

The display medium 230 is, for example, a non self-illuminating display medium such as a liquid crystal material, an electrophoretic display material and so on. In the present embodiment, the display device 10 is, for example, a liquid crystal display device. However, the invention is not limited thereto.

Referring to FIG. 1 and FIG. 2 together, the pixel array 220 includes a plurality of scan lines 222, a plurality of data lines 224, and a plurality of pixel units 226. The scan lines 222 extend along X direction, and the data lines 224 extend along Y direction. Generally, each of the pixel units 226 includes an active device 225 and a pixel electrode 227 electrically connected to the active device 225, and each of the pixel units 226 is electrically connected to the corresponding scan line 222 and the corresponding data line 224. The active device 225 is a thin film transistor, for example. In addition, the pixel unit 226 can be any pixel unit well-known by persons skilled in the art, thus the pixel unit 266 of the invention is not limited to that of FIG. 2.

Referring FIG. 1, FIG. 2 and FIG. 3 together, the color filter array 240 is disposed correspondingly to the pixel array 220. The color filter array 240 includes a shielding pattern 242 and a plurality of color filter patterns.

The shielding pattern 242 defines a plurality of unit regions 243 corresponding to the pixel units 226 on the substrate 250. In other words, spatially, the shielding pattern 242 can be completely overlapped or partially overlapped, with the scan lines 222 and the data lines 224. In addition, a material of the shielding pattern 242 is, for example, a black resin or a shielding metal, and more preferably, being composed by low reflective materials.

In the present embodiment, the color filter patterns include a red filter pattern R, a green filter pattern G, and a blue filter pattern B. Accordingly, the display device 10 can display red, green and blue by having the light emitted by the backlight module 100 to pass through the red filter pattern R, the green filter pattern G and the blue filter pattern B, respectively. Further, the red filter pattern R, the green filter pattern G and the blue filter pattern B are respectively corresponding to one among the pixel units 243. In other words, the red filter pattern R, the green filter pattern G and the blue filter pattern B are disposed correspondingly to one among the pixel units 243 defined by the shielding pattern 242, respectively. In addition, persons skilled in the art should understand that, disposing of the color filter patterns in the color filter array can be adjusted according to actual design requirements. Therefore, the color filter array 240 of the invention is not limited to that of FIG. 3. In addition, the color filter array 240 of the present embodiment is disposed on the substrate 250, but the invention is not limited thereto. In other embodiments, the color filter layer 240 can also be disposed on the substrate 210.

Furthermore, in the present embodiment, the red filter pattern R and the blue filter pattern B can respectively be any one red filter pattern or any one blue filter pattern which are well-known by persons skilled in the art. It can be known from the color gamut used by the current display devices that, red and blue displayed by said display device generally have a chromaticity similar to that of red and blue set in a wide color gamut standard. That is, any one red filter pattern or any one blue filter pattern well-known by persons skilled in the art can be used to provide red and blue with preferable color saturation. Thus, based on above condition, a wide color gamut of the display device can be effectively enhanced by improving a color saturation of green. In the present embodiment, the green filter pattern G and the backlight module 100 are required to satisfy following relation:

$$\sum_{553}^{562} BL(\lambda) \times CF_{Green}(\lambda) \times \Delta\lambda \leq 4$$

$$\sum_{580}^{600} BL(\lambda) \times CF_{Green}(\lambda) \times \Delta\lambda \leq 2$$

$$\sum_{601}^{650} BL(\lambda) \times CF_{Green}(\lambda) \times \Delta\lambda \leq 1.2$$

$BL(\lambda) \times CF_{Green}(\lambda)$ represents a normalized result of a product of a luminance spectrum in a specific wavelength range and a transmittance of light in the specific wavelength range passing through the green filter pattern G, and $\Delta\lambda$ is a light wavelength interval. Therein, the normalized result is obtained by setting, within a wavelength range of visual lights (380 nm to 780 nm), a maximum luminance from a product of $BL(\lambda)$ and $CF_{Green}(\lambda)$ under a specific wavelength, as 1.0. In order to simplify calculation, a parameter $\Delta\lambda$ is usually set to 1.

More specifically, referring to the mathematical relation above, within a range of marginal wavelength at which green is less saturated (e.g., 553-562 nm, 580-600 nm and 601-650 nm), products of backlight module 110 luminance $BL(\lambda)$ and the transmittance $CF_{Green}(\lambda)$ of the green filter pattern G in above wavelength ranges are added together, resulting a sum which is less than or equal to a specific value. In other words, the green filter pattern G of the display device 10, which satisfies the mathematical relation above, can filter out the light having the marginal wavelength at which green is less saturated, so as to display green light with improved color saturation.

Accordingly, when a combination of the green filter pattern G and the backlight module 100 satisfies the mathematical relation above, since a color purity of green wavelength after the light of the backlight module 100 passed through the green filter pattern G in the display panel 10 is above a specific level, green displayed by the display device 10 can also have a chromaticity similar to green in the wide color gamut standard, so as to effectively enhance the wide color gamut of the display device. In the present embodiment, a material of the green filter pattern G is, for example, PG-58 pigment or PG-7 pigment.

In addition, a x coordinate of green light displayed by the display device 10 corresponding to a chromaticity coordinates of CIE is less than 0.22 and a y coordinate of green displayed by the display device 10 corresponding to the chromaticity coordinates of CIE is greater than 0.70. Herein, the x coordinate of green corresponding to the chromaticity coordinates of CIE is represented by Gx, and the y coordinate of green corresponding to the chromaticity coordinates of CIE is represented by Gy. More specifically, when Gx is less than 0.22 and Gy is greater than 0.70 in the display device 10 using any one red filter pattern or any one blue filter pattern well-known by persons skilled in the art, the wide color gamut of the display device 10 is capable of achieving a level of the wide color gamut standard being equal to 99% or greater than 99%. Herein, "the wide color gamut of the display device 10 is capable of achieving a level of the wide color gamut standard being equal to 99% or greater than 99%" means that the display device 10 is a display device with wide color gamut, wherein the wide color gamut standard is, for example, Adobe RGB.

For instance, in case the wide color gamut standard is Adobe RGB (green coordinates being (0.21, 0.71), red coordinates being (0.64, 0.33) and blue coordinates being (0.15, 0.06) and red coordinates and blue coordinates of the display device 10 are similar to that of Adobe RGB, a more preferable wide color gamut can be obtained when Gx is less than 0.22 and Gy is greater than 0.70, as shown in Table 1 below. A wide color gamut in Table 1 is defined as a percentage of color gamut area of the display device 10 occupying Adobe RGB area.

TABLE 1

| Display device 10 | | Wide color |
|---|---|---|
| Gx | Gy | gamut |
| 0.22 | 0.71 | 98% |
| 0.22 | 0.70 | 97% |
| 0.21 | 0.70 | 98% |
| 0.215 | 0.705 | 99% |
| 0.21 | 0.71 | 100% |
| 0.20 | 0.72 | 100% |

In view of Table 1, when the green coordinates meet a condition of Gx being less than 0.22 and Gy being greater than 0.70, the wide color gamuts of the display device 10 are all equal to 99% Adobe RGB or greater than 99% Adobe RGB, that is, the display device 10 is provided with a characteristic of wide color gamut. On the contrary, when the green coordinates do not meet the condition of Gx being less than 0.22 and Gy being greater than 0.70, the wide color gamuts of the display device 10 are all less than 99% Adobe RGB.

It should be noted that, the display device 10 displays green that meets the mathematical relation above by using the backlight module 10 with the green filter pattern G, and coordinates of said green is further limited to the condition of Gx being less than 0.22 and Gy being greater than 0.70, so as to achieve the purpose of having the wide color gamut.

Subsequently, in order to prove that the display device 10 in the foregoing embodiments does have characteristics of wide color gamut and high color saturation, examples and comparison examples are provided to further describe the invention. However, the examples below are not intended to limit the invention. Further, in each of the examples and comparison examples below, the same red filter pattern and the same blue filter pattern are used, wherein the red filter pattern is PR-177 pigment and the blue filter pattern is PB 15:6 pigment. Spectra in the embodiments of the invention all satisfy the red coordinates (0.64, 0.33) and the blue coordinates (0.15, 0.06) in the wide color gamut standard.

Example 1

A light emitting diode unit of a backlight module used in Example 1 can be implemented by using the light emitting diode unit 102 of the first embodiment, wherein a light emission wavelength of at least one red light emitting diode is 610 nm to 660 nm; a light emission wavelength of at least one blue light emitting diode is 410 nm to 460 nm; and $MGa_2S_4$:Eu, (M=Ca, Sr, Ba), is served as a green fluorescent material having a luminance wavelength less than or equal to 540 nm. A material of the green filter pattern used in Example 1 is PG-7 pigment. Moreover, in a combination of the green filter pattern and the backlight module used in Example 1, the sum of products of the backlight module luminance BL(λ) and the transmittance $CF_{Green}(\lambda)$ of the green filter pattern in each specific wavelength range, the green coordinates and the wide color gamut are as listed in Table 2 below, wherein the wide color gamut of Table 2 is defined as identical to the wide color gamut of Table 1.

Example 2

A light emitting diode unit of a backlight module used in Example 2 can be implemented by using the light emitting diode unit 102 of the first embodiment, wherein a light emission wavelength of at least one red light emitting diode is 610 nm to 660 nm; a light emission wavelength of at least one blue light emitting diode is 410 nm to 460 nm; and β-SiAlON is served as a green fluorescent material having a luminance wavelength less than or equal to 540 nm. A material of the green filter pattern used in Example 2 is PG-7 pigment. Moreover, in a combination of the green filter pattern and the backlight module used in Example 2, the sum of products of the backlight module luminance BL(λ) and the transmittance $CF_{Green}(\lambda)$ of the green filter pattern in each specific wavelength range, the green coordinates and the wide color gamut are as listed in Table 2 below.

Example 3

A light emitting diode unit of a backlight module used in Example 3 can be implemented by using the light emitting diode unit 102 of the second embodiment, wherein a light emission wavelength of at least one green light emitting diode is 500 nm to 550 nm; a light emission wavelength of at least one blue light emitting diode is 410 nm to 460 nm; and $CaAlSiN_3$:Eu is served as a red fluorescent material having a luminance wavelength greater than or equal to 600 nm. A material of the green filter pattern used in Example 3 is PG-7 pigment. Moreover, in a combination of the green filter pattern and the backlight module used in Example 3, the sum of products of the backlight module luminance BL(λ) and the transmittance $CF_{Green}(\lambda)$ of the green filter pattern in each specific wavelength range, the green coordinates and the wide color gamut are as listed in Table 2 below.

Example 4

A light emitting diode unit of a backlight module used in Example 4 can be implemented by using the light emitting diode unit 102 of the second embodiment, wherein a light emission wavelength of at least one green light emitting diode is 500 nm to 550 nm; a light emission wavelength of at least one blue light emitting diode is 410 nm to 460 nm; and CaS:Eu is served as a red fluorescent material having a luminance wavelength greater than or equal to 600 nm. A material of the green filter pattern used in Example 4 is PG-58 pigment. Moreover, in a combination of the green filter pattern and the backlight module used in Example 4, the sum of products of the backlight module luminance BL(λ) and the transmittance $CF_{Green}(\lambda)$ of the green filter pattern in each specific wavelength range, the green coordinates and the wide color gamut are as listed in Table 2 below.

Example 5

A light emitting diode unit of a backlight module used in Example 5 can be implemented by using the light emitting diode unit 102 of the second embodiment, wherein a light emission wavelength of at least one green light emitting diode is 500 nm to 550 nm; a light emission wavelength of at least one blue light emitting diode is 410 nm to 460 nm; and CaS:Eu is served as a red fluorescent material having a luminance wavelength greater than or equal to 600 nm. A material of the green filter pattern used in Example 5 is PG-7 pigment. Moreover, in a combination of the green filter pattern and the backlight module used in Example 5, the sum of products of the backlight module luminance BL(λ) and the transmittance $CF_{Green}(\lambda)$ of the green filter pattern in each specific wavelength range, the green coordinates and the wide color gamut are as listed in Table 2 below.

Example 6

A light emitting diode unit of a backlight module used in Example 6 can be implemented by using the light emitting diode unit 102 of the third embodiment, wherein a light emission wavelength of at least one red light emitting diode is 610 nm to 660 nm; a light emission wavelength of at least one blue light emitting diode is 410 nm to 460 nm; and a light emission wavelength of at least one green light emitting diode is 500 nm to 550 nm. A material of the green filter pattern used in Example 6 is PG-58 pigment. Moreover, in a combination of the green filter pattern and the backlight module used in Example 6, the sum of products of the backlight module luminance BL(λ) and the transmittance $CF_{Green}(\lambda)$ of the green filter pattern in each specific wavelength range, the green coordinates and the wide color gamut are as listed in Table 2 below.

Example 7

A light emitting diode unit of a backlight module used in Example 7 can be implemented by using the light emitting diode unit 102 of the third embodiment, wherein a light emission wavelength of at least one red light emitting diode is 610 nm to 660 nm; a light emission wavelength of at least one blue light emitting diode is 410 nm to 460 nm; and a light emission wavelength of at least one green light emitting diode is 500 nm to 550 nm. A material of the green filter pattern used in Example 1 is PG-7 pigment. Moreover, in a combination of the green filter pattern and the backlight module used in Example 7, the sum of products of the backlight module luminance BL(λ) and the transmittance $CF_{Green}(\lambda)$ of the green filter pattern in each specific wavelength range, the green coordinates and the wide color gamut are as listed in Table 2 below.

Example 8

A light emitting diode unit of a backlight module used in Example 8 can be implemented by using the light emitting diode unit 102 of the fourth embodiment, wherein a light emission wavelength of at least one blue light emitting diode is 410 nm to 460 nm; and CdSe/ZnSe is served as red and green fluorescent materials. A material of the green filter pattern used in Example 8 is PG-7 pigment. Moreover, in a combination of the green filter pattern and the backlight module used in Example 8, the sum of products of the backlight module luminance BL(λ) and the transmittance $CF_{Green}(\lambda)$ of the green filler pattern in each specific wavelength range, the green coordinates and the wide color gamut are as listed in Table 2 below.

Comparison Example 1

A light emitting diode unit of a backlight module used in Comparison Example 1 includes at least one blue light emitting diode having a light emission wavelength being 410 nm to 460 nm; and $Y_3Al_5O_{12}$:Ce served as a yellow fluorescent material. A material of the green filter pattern used in Comparison Example 1 is PG-58 pigment. Moreover, in a combination of the green filter pattern and the backlight module used in Comparison Example 1, the sum of products of the backlight module luminance BL(λ) and the transmittance $CF_{Green}(λ)$ of the green filter pattern in each specific wavelength range, the green coordinates and the wide color gamut are as listed in Table 2 below.

Comparison Example 2

A light emitting diode unit of a backlight module used in Comparison Example 2 includes at least one blue light emitting diode having a light emission wavelength being 410 nm to 460 nm; and $Y_3Al_5O_{12}$:Ce served as a yellow fluorescent material. A material of the green filter pattern used in Comparison Example 2 is PG-7 pigment. Moreover, in a combination of the green filter pattern and the backlight module used in Comparison Example 2, the sum of products of the backlight module luminance BL(λ) and the transmittance $CF_{Green}(λ)$ of the green filter pattern in each specific wavelength range, the green coordinates and the wide color gamut are as listed in Table 2 below.

Comparison Example 3

A light emitting diode unit of a backlight module used in Comparison Example 3 includes at least one blue light emitting diode having a light emission wavelength being 410 nm to 460 nm; a silicate $(SrBa)_2SiO_4$:Eu served a green fluorescent material, with a full width at half maximum (FWHM) of the peak being approximately equal to 70 nm; and $(CaSr)AlSiN_3$:Eu served as a red fluorescent material having a luminance wavelength greater than or equal to 600 nm. A material of the green filter pattern used in Comparison Example 3 is PG-58 pigment. Moreover, in a combination of the green filter pattern and the backlight module used in Comparison Example 3, the sum of products of the backlight module luminance BL(λ) and the transmittance $CF_{Green}(λ)$ of the green filter pattern in each specific wavelength range, the green coordinates and the wide color gamut are as listed in Table 2 below.

Comparison Example 4

A light emitting diode unit of a backlight module used in Comparison Example 4 includes at least one blue light emitting diode having a light emission wavelength being 410 nm to 460 nm; a silicate $(SrBa)_2SiO_4$:Eu served a green fluorescent material, with a full width at half maximum (FWHM) of the peak being approximately equal to 70 nm; and $(CaSr)AlSiN_3$:Eu served as a red fluorescent material having a luminance wavelength greater than or equal to 600 nm. A material of the green filter pattern used in Comparison Example 4 is PG-7 pigment. Moreover, in a combination of the green filter pattern and the backlight module used in Comparison Example 4, the sum of products of the backlight module luminance BL(λ) and the transmittance $CF_{Green}(λ)$ of the green filter pattern in each specific wavelength range, the green coordinates and the wide color gamut are as listed in Table 2 below.

Comparison Example 5

A light emitting diode unit of a backlight module used in Comparison Example 5 can be implemented by using the light emitting diode unit 102 of the fifth embodiment, wherein a light emission wavelength of at least one red light emitting diode is 410 nm to 460 nm; and CaS:Eu is served as a red fluorescent material having a luminance wavelength greater than or equal to 600 nm and $(SrBa)Ga_2S_4$:Eu is served as a green fluorescent material having a luminance wavelength less than or equal to 540 nm. A material of the green filter pattern used in Comparison Example 5 is PG-58 pigment. Moreover, in a combination of the green filter pattern and the backlight module used in Comparison Example 5, the sum of products of the backlight module luminance BL(λ) and the transmittance $CF_{Green}(λ)$ of the green filter pattern in each specific wavelength range, the green coordinates and the wide color gamut are as listed in Table 2 below.

Comparison Example 6

A light emitting diode unit of a backlight module used in Comparison Example 6 can be implemented by using the light emitting diode unit 102 of the fifth embodiment, wherein a light emission wavelength of at least one red light emitting diode is 410 nm to 460 nm; and CaS:Eu is served as a red fluorescent material having a luminance wavelength greater than or equal to 600 nm and $(SrBa)Ga_2S_4$:Eu is served as a green fluorescent material, having a luminance wavelength less than or equal to 540 nm. A material of the green filter pattern used in Comparison Example 6 is PG-7 pigment. Moreover, in a combination of the green filter pattern and the backlight module used in Comparison. Example 6, the sum of products of the backlight module luminance BL(λ) and the transmittance $CF_{Green}(λ)$ of the green filter pattern in each specific wavelength range, the green coordinates and the wide color gamut are as listed in Table 2 below.

Comparison Example 7

A light emitting diode unit of a backlight module used in Comparison Example 7 can be implemented by using the light emitting diode unit 102 of the fifth embodiment, wherein a light emission wavelength of at least one blue light emitting diode is 410 nm to 460 nm; and $CaAlSiN_3$:Eu is served as a red fluorescent material having a luminance wavelength greater than or equal to 600 nm and β-SiAlON is served as a green fluorescent material having a luminance wavelength less than or equal to 540 nm. A material of the green filter pattern used in Comparison Example 7 is PG-58 pigment. Moreover, in a combination of the green filter pattern and the backlight module used in Comparison Example 7, the sum of products of the backlight module luminance BL(λ) and the transmittance $CF_{Green}(λ)$ of the green filter pattern in each specific wavelength range, the green coordinates and the wide color gamut are as listed in Table 2 below.

Comparison Example 8

A light emitting diode unit of a backlight module used in Comparison Example 8 can be implemented by using the light emitting diode unit 102 of the fifth embodiment, wherein a light emission wavelength of at least one blue light emitting diode is 410 nm to 460 nm; and $CaAlSiN_3$:Eu is served as a red fluorescent material having a luminance wavelength greater than or equal to 600 nm and β-SiAlON is served as a green fluorescent material having a luminance wavelength less than or equal to 540 nm. A material of the green filter pattern used in Comparison Example 8 is PG-7 pigment. Moreover, in a combination of the green filter pattern and the backlight module used in Comparison Example 8, the sum of products of the backlight module luminance BL(λ) and the transmittance $CF_{Green}(λ)$ of the green filter pattern in each specific wavelength range, the green coordinates and the wide color gamut are as listed in Table 2 below.

Comparison Example 9

A light emitting diode unit of a backlight module used in Comparison Example 9 can be implemented by using the light emitting diode unit 102 of the first embodiment, wherein a light emission wavelength of at least one red light emitting diode is 610 nm to 660 nm; a light emission wavelength of at least one blue light emitting diode is 410 nm to 460 nm; and $(SrBa)Ga_2S_4$:Eu, is served as a green fluorescent material, having a luminance wavelength less than or equal to 540 nm. A material of the green filter pattern used in Comparison Example 9 is PG-58 pigment. Moreover, in a combination of the green filter pattern and the backlight module used in Comparison Example 9, the sum of products of the backlight module luminance BL(λ) and the transmittance $CF_{Green}(λ)$ of the green filter pattern in each specific wavelength range, the green coordinates and the wide color gamut are as listed in Table 2 below.

Comparison Example 10

A light emitting diode unit of a backlight module used in Comparison Example 10 can be implemented by using the light emitting diode unit 102 of the first embodiment, wherein a light emission wavelength of at least one red light emitting diode is 610 nm to 660 nm; a light emission wavelength of at least one blue light emitting diode is 410 nm to 460 nm; and β-SiAlON is served as a green fluorescent material having a luminance wavelength less than or equal to 540 nm. A material of the green filter pattern used in Comparison Example 10 is PG-58 pigment. Moreover, in a combination of the green filter pattern and the backlight module used in Comparison Example 10, the sum of products of the backlight module luminance BL(λ) and the transmittance $CF_{Green}(λ)$ of the green filter pattern in each specific wavelength range, the green coordinates and the wide color gamut are as listed in Table 2 below.

Comparison Example 11

A light emitting diode unit of a backlight module used in Comparison Example 11 can be implemented by using the light emitting diode unit 102 of the second embodiment, wherein a light emission wavelength of at least one green light emitting diode is 500 nm to 550 nm; a light emission wavelength of at least one blue light emitting diode is 410 nm to 460 nm; and $CaAlSiN_3$:Eu is served as a red fluorescent material having a luminance wavelength greater than or equal to 600 nm. A material of the green filter pattern used in Comparison Example 11 is PG-58 pigment. Moreover, in a combination of the green filter pattern and the backlight module used in Comparison Example 11, the sum of products of the backlight module luminance BL(λ) and the transmittance $CF_{Green}(λ)$ of the green filter pattern in each specific wavelength range, the green coordinates and the wide color gamut are as listed in Table 2 below.

Comparison Example 12

A light emitting diode unit of a backlight module used in Comparison Example 12 can be implemented by using the light emitting diode unit 102 of the fourth embodiment, wherein a light emission wavelength of at least one blue light emitting diode is 410 nm to 460 nm; and CdSe/ZnSe is served as red and green fluorescent materials. A material of the green filter pattern used in Comparison Example 12 is PG-58 pigment. Moreover, in a combination of the green filter pattern and the backlight module used in Comparison Example 12, the sum of products of the backlight module luminance BL(λ) and the transmittance $CF_{Green}(λ)$ of the green filter pattern in each specific wavelength range, the green coordinates and the wide color gamut are as listed in Table 2 below.

TABLE 2

| | Sum of product of BL(λ) and $CF_{Green}(λ)$ in each specific wavelength range | | | | | |
|---|---|---|---|---|---|---|
| | 553-562 nm (sum of products ≤ 4) | 580-600 nm (sum of products ≤ 2) | 601-650 nm (sum of products ≤ 1.2) | Green coordinates | | Wide color gamut |
| | | | | Gx | Gy | |
| Example 1 | 3.8 | 0.5 | 0.3 | 0.212 | 0.714 | 100% |
| Example 2 | 3.4 | 0.6 | 0.4 | 0.216 | 0.714 | 100% |
| Example 3 | 2.0 | 1.0 | 0.3 | 0.207 | 0.714 | 99% |
| Example 4 | 2.0 | 1.1 | 1.1 | 0.216 | 0.712 | 99% |
| Example 5 | 1.7 | 0.4 | 0.3 | 0.184 | 0.730 | 100% |
| Example 6 | 1.7 | 0.5 | 1.0 | 0.195 | 0.722 | 100% |
| Example 7 | 1.4 | 0.2 | 0.3 | 0.171 | 0.736 | 100% |
| Example 8 | 1.8 | 0.2 | 0.3 | 0.206 | 0.730 | 100% |
| Comparison Example 1 | 8.4 | 7.8 | 2.0 | 0.320 | 0.626 | 73% |
| Comparison Example 2 | 7.2 | 3.1 | 0.3 | 0.268 | 0.666 | 85% |
| Comparison Example 3 | 7.0 | 6.3 | 2.1 | 0.300 | 0.631 | 79% |
| Comparison Example 4 | 5.9 | 2.4 | 0.4 | 0.248 | 0.671 | 90% |
| Comparison Example 5 | 5.4 | 2.6 | 1.5 | 0.261 | 0.670 | 90% |
| Comparison Example 6 | 4.6 | 1.0 | 0.3 | 0.225 | 0.692 | 98% |

TABLE 2-continued

| | Sum of product of BL(λ) and CF$_{Green}$(λ) in each specific wavelength range | | | Green coordinates | | Wide color |
|---|---|---|---|---|---|---|
| | 553-562 nm (sum of products ≤ 4) | 580-600 nm (sum of products ≤ 2) | 601-650 nm (sum of products ≤ 1.2) | Gx | Gy | gamut |
| Comparison Example 7 | 5.1 | 3.5 | 1.6 | 0.282 | 0.658 | 84% |
| Comparison Example 8 | 4.3 | 1.3 | 0.3 | 0.237 | 0.696 | 94% |
| Comparison Example 9 | 4.4 | 1.1 | 1.0 | 0.241 | 0.693 | 92% |
| Comparison Example 10 | 4.0 | 1.6 | 2.1 | 0.258 | 0.678 | 90% |
| Comparison Example 11 | 2.4 | 2.8 | 1.8 | 0.259 | 0.679 | 89% |
| Comparison Example 12 | 2.1 | 0.8 | 1.5 | 0.240 | 0.706 | 93% |

In view of Table 2, in Examples 1 to 8, since spectra of the backlight modules being used all having three peaks in which a full width at half maximum (FWHM) of the peak of a green light is less than or equal to 55 nm; the sum of products of the backlight module luminance BL(λ) and the transmittance CF$_{Green}$(λ) in each wavelength range (553-562 nm, 580-600 nm and 601-650 nm) meets the mathematical relation as disclosed above; and all of green coordinates meet the condition of Gx being less than 0.22 and Gy being greater than 0.70, thus the wide color gamuts of Examples 1 to 8 respectively fall in a range between 99% Adobe RGB and 100% Adobe RGB, that is to say, Examples 1 to 8 all have the characteristics of wide color gamut and high color saturation. On the contrary, in view of Table 2, none of Comparison Examples 1-12 has the preferable wide color gamut and color saturation, such that the wide color gamuts therein all fall in a range between 73% Adobe RGB and 98% Adobe RGB.

In summary, in the display devices as provided in foregoing embodiments, since spectra of the backlight modules all having three peaks in which a full width at half maximum of the peak of a green light is less than or equal to 55 nm; the combination of the green filter pattern and the backlight module meets the mathematical relation as required; and Gx is limited to be less than 0.22 and Gy is limited to be greater than 0.70, therefore, the color gamut and the high color saturation of the display device are both enhanced so as to achieve the level of wide color gamut.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A display device, comprising:
   a backlight module, a spectrum of the backlight module having three peaks for the backlight module to emit a white light, wherein a full width at half maximum of the peak (FWHM) in a range of a green wavelength among the three peaks is less than or equal to 55 nm; and
   a display panel disposed on a light emitting surface of the backlight module, the display panel including a pixel array and a color filter array disposed correspondingly to the pixel array, the color filter array including a red filter pattern, a green filter patter and a blue filter pattern, and the green filter pattern and the backlight module satisfying following relation:

$$\sum_{553}^{562} BL(\lambda) \times CF_{Green}(\lambda) \times \Delta\lambda \leq 4$$

$$\sum_{580}^{600} BL(\lambda) \times CF_{Green}(\lambda) \times \Delta\lambda \leq 2$$

$$\sum_{601}^{650} BL(\lambda) \times CF_{Green}(\lambda) \times \Delta\lambda \leq 1.2$$

wherein BL(λ)×CF$_{Green}$(λ) represents a normalized result of a product of a luminance spectrum in a specific wavelength range and a transmittance of light in the specific wavelength range passing through the green filter pattern, and Δλ is a light wavelength interval, wherein a x coordinate of green light displayed by the display device corresponding to a chromaticity coordinates of CIE is less than 0.22 and a y coordinate of the green light displayed by the display device corresponding to the chromaticity coordinates of CIE is greater than 0.70.

2. The display device of claim 1, wherein the backlight module comprises at least one light emitting diode unit.

3. The display device of claim 2, wherein the light emitting diode unit comprises at least one red light emitting diode, at least one blue light emitting diode and a green fluorescent material.

4. The display device of claim 3, wherein a light emission wavelength of the red light emitting diode is 610 nm to 660 nm, a light emission wavelength of the blue light emitting diode is 410 nm to 460 nm, and a luminance wavelength of the green fluorescent material is less than or equal to 540 nm.

5. The display device of claim 3, wherein the green fluorescent material comprises a fluorescent material of sulfide or a fluorescent material of oxynitride.

6. The display device of claim 2, wherein the light emitting diode unit comprises at least one green light emitting diode, at least one blue light emitting diode and a red fluorescent material.

7. The display device of claim 6, wherein a light emission wavelength of the green light emitting diode is 500 nm to 550 nm, a light emission wavelength of the blue light emitting diode is 410 nm to 460 nm, and a luminance wavelength of the red fluorescent material is greater than or equal to 600 nm.

8. The display device of claim 6, wherein the red fluorescent material comprises a fluorescent material of sulfide or a fluorescent material of nitride.

9. The display device of claim 2, wherein the light emitting diode unit comprises at least one red light emitting diode, at least one green light emitting diode and at least one blue light emitting diode.

10. The display device of claim 9, wherein a light emission wavelength of the red light emitting diode is 610 nm to 660 nm, a light emission wavelength of the green light emitting diode is 500 nm to 550 nm, and a light emission wavelength of the blue light emitting diode is 410 nm to 460 nm.

11. The display device of claim 2, wherein the light emitting diode unit comprises at least one blue light emitting diode, a red fluorescent material and a green fluorescent material.

12. The display device of claim 11, wherein a light emission wavelength of the blue light emitting diode is 410 nm to 460 nm.

13. The display device of claim 11, wherein the red fluorescent material comprises a fluorescent material of a red quantum dot (QD), and the green fluorescent material comprises a fluorescent material of a green quantum dot (QD).

14. The display device of claim 11, wherein the red fluorescent material comprises a fluorescent material of sulfide or a fluorescent material of nitride, the green fluorescent material comprises a fluorescent material of sulfide or a fluorescent material of oxynitride, and a luminance wavelength of the green fluorescent material is less than or equal to 540 nm.

* * * * *